United States Patent [19]
Yamagata et al.

[11] Patent Number: 5,233,644
[45] Date of Patent: Aug. 3, 1993

[54] CORDLESS TELEPHONE WITH ACTUATION OF OFF-HOOK CONDITION BY OPERATION OF DIAL KEY

[75] Inventors: Masato Yamagata; Kanji Ohnishi, both of Kanagawa; Takeho Yamada, Tokyo, all of Japan

[73] Assignee: Sony Corporation, Tokyo, Japan

[21] Appl. No.: 637,117

[22] Filed: Jan. 3, 1991

[30] Foreign Application Priority Data

Jan. 12, 1990 [JP] Japan ........................... 2-005667
Mar. 29, 1990 [JP] Japan ........................... 2-081701
May 10, 1990 [JP] Japan ........................... 2-120378

[51] Int. Cl.[5] ..................... H04M 11/00; H04Q 7/00
[52] U.S. Cl. ........................... 379/61; 379/56; 379/58; 379/354; 455/31.1
[58] Field of Search ............... 379/56, 58, 61, 63, 379/354; 455/31.1

[56] References Cited

U.S. PATENT DOCUMENTS

| | | | |
|---|---|---|---|
| 4,053,717 | 10/1977 | Snider | 455/31.1 |
| 4,450,319 | 5/1984 | Lucey | 379/56 |
| 4,723,265 | 2/1988 | Kamei et al. | 379/58 |
| 4,736,410 | 4/1988 | Nishida et al. | 379/354 |
| 4,910,761 | 3/1990 | Shimura et al. | 379/61 |
| 4,962,524 | 10/1990 | Murata et al. | 379/61 |
| 4,985,912 | 1/1991 | Oro | 379/61 |

FOREIGN PATENT DOCUMENTS

| | | | |
|---|---|---|---|
| 0435775 | 7/1991 | European Pat. Off. | 379/61 |
| 1170151 | 7/1986 | Japan | 379/61 |
| 2283723 | 12/1987 | Japan | 379/61 |
| 63-38331 | 2/1988 | Japan | 379/61 |

OTHER PUBLICATIONS

Sony Corporation, "Cordless Telephone SPP-100" 1985.
Panasonic "Cordlessphone Model #KX-T3000", 1988.

*Primary Examiner*—Curtis Kuntz
*Assistant Examiner*—William Cumming
*Attorney, Agent, or Firm*—William S. Frommer; Alvin Sinderbrand

[57] ABSTRACT

A cordless telephone having a base unit to be connected to a telephone line network and a handset unit to be connected to the base unit through a communication channel upon initiation of a telephone conversation. The cordless telephone includes a detecting circuit provided in the handset unit for detecting removal of the handset unit from a predetermined standby position, and a circuit for generating a command signal such that, when the detection output of the detecting circuit indicates that the handset unit is picked up from the predetermined standby position and, on the condition that a dial key of the handset unit is operated, the base unit is connected to the telephone line network.

10 Claims, 8 Drawing Sheets

CORDLESS TELEPHONE WITH ACTUATION OF OFF-HOOK CONDITION BY OPERATION OF DIAL KEY

BACKGROUND OF THE INVENTION

1. Field of the Invention

The present invention generally relates to cordless telephones and, more particularly, to a cordless telephone in which a battery incorporated therein can be prevented from being consumed uselessly and in which a telephone line network can be prevented from being captured meaninglessly.

2. Description of the Prior Art

In a standard telephone set, the user can dial a number for making an outgoing call or can receive an incoming call by only picking up a transmitter and receiver from the telephone body.

Incidentally, when the user receives an incoming call by the cordless telephone, the following operations are needed:

(1) hold a handset unit (remote station) in one's hand, and (2) depress a talk button. This depression of the talk button opens a communication channel between the handset unit and a base unit (master station) and also connects the base unit to the telephone line network.

When the user wants to make an outgoing call, after the above operations (1) and (2) the user has to dial the phone number of the other party (3).

These operations are cumbersome for the user and make the cordless telephone inconvenient as compared with a standard telephone set in which the user can make an outgoing call and receive an incoming call only by picking up the transmitter and receiver from the standard telephone set.

To remove such disadvantages, a proposed cordless telephone has a special function which might be called a "quick talk" function. This type of cordless telephone having such quick talk function will be explained hereinafter.

The handset unit of the cordless telephone system generally incorporates therein a rechargeable battery as an operation power source so that the base unit has a charging circuit therein or a special charging stand is provided for charging the battery of the handset unit. When the handset unit is not in use, the handset unit is set in the base unit at its predetermined charging position or the handset unit is placed in the charging stand. Then, in this condition, a charging current flows to the battery incorporated within the handset unit so that the handset unit is placed in the standby mode on the basis of a detected output of the charging current, and so that the base unit also is placed in the standby mode.

When the user wants to make an outgoing call or the user wants to receive an incoming call, the user picks up the handset unit from the base unit or from the charging stand. Then, the charging current is inhibited from flowing to the handset unit and a process corresponding to "depress a talk button" in the above-mentioned item (2) is performed in the handset unit on the basis of the detected output, so that a communication channel is opened between the handset unit and the base unit and the base unit is connected to the telephone line network.

If the cordless telephone system has such quick talk function, the cordless telephone can be utilized as the standard telephone set while the advantages of the cordless telephone are still maintained.

Incidentally, in the cordless telephone having the above-mentioned quick talk function, if the user picks up the handset unit from the base unit for reasons than telephone conversation, such as when the user picks up the handset unit to clean the smudged handset unit and when the user picks up the handset unit to register an abbreviated phone number in the handset unit, the communication channel is unavoidably opened between the handset unit and the base unit and also the base unit is unavoidably connected to the telephone line network, so that the battery of the handset unit is consumed uselessly. Furthermore, the telephone line network is occupied meaninglessly (the telephone line network is captured uselessly), which causes trouble in the telephone office and which hinders the cordless telephone from receiving an incoming call.

Furthermore, when the handset unit is unintentionally knocked down from or disengaged from the base unit or from the charging stand due to some vibration or the like, similar problems will arise.

OBJECTS AND SUMMARY OF THE INVENTION

Accordingly, it is an object of the present invention to provide an improved cordless telephone which can substantially eliminate the aforenoted shortcomings and disadvantages encountered with the prior art.

More specifically, it is an object of the present invention to provide a cordless telephone in which when a handset unit is picked up from a stand other than to carry out a telephone communication or when the handset unit falls from a the stand, a communication channel can be prevented from being meaninglessly opened between the handset unit and the base unit and the base unit can be prevented from being connected to a telephone line network.

It is another object of the present invention to provide a cordless telephone in which a battery of a handset unit can be prevented from being consumed uselessly.

It is still another object of the present invention to provide a cordless telephone by which the user can make an outgoing call or receive an incoming call by means of a talk key.

It is a further object of the present invention to provide a cordless telephone which can be used conveniently and usefully.

According to a first aspect of the present invention, a cordless telephone having a base unit connected to a telephone line network and a handset unit connected to the base unit through a communication channel upon telephone conversation is comprised of a detecting circuit provided in the handset unit for detecting that the handset unit is picked up from a predetermined standby place position, and a circuit for inhibiting the base unit from making a connection request to the telephone line network on the basis of a detection output from the detecting circuit, wherein when the detection output of the detecting circuit indicates that the handset unit is picked up from the predetermined standby place position and when a dial key of the handset unit is operated, the base unit is connected to the telephone line network.

According to a second aspect of the present invention, a cordless telephone having a base unit connected to a telephone line network and a handset unit connected to the base unit through a communication channel upon telephone conversation is comprised of a detecting circuit provided in the handset unit for detecting that the handset unit is picked up from a predetermined standby place position, and a circuit for inhibiting the base unit from making a connection request to the telephone line network on the basis of a detection output from the detecting circuit, wherein when the detection output of the detecting circuit indicates that the handset unit is picked up from the predetermined standby place position and when a dial key of the handset unit is operated, the communication channel is opened between the handset unit and the base unit.

In accordance with a third aspect of the present invention, a cordless telephone having a base unit connected to a telephone line network and a handset unit connected to the base unit through a communication channel upon telephone conversation is comprised of a detecting circuit provided in the handset unit for detecting that the handset unit is picked up from a predetermined standby place position, and a circuit for inhibiting the base unit from making a connection request to the telephone line network on the basis of a detection output from the detecting circuit, wherein when the detection output of the detecting circuit indicates that the handset unit is picked up from the predetermined standby place position, the communication channel is opened between the handset unit and the base unit and when a dial key of the handset unit is operated, the base unit is connected to the telephone line network and dial data of the dial key is transmitted to the telephone line network from the handset unit through the base unit to thereby make an outgoing call.

The above, and other objects, features and advantages of the present invention will become apparent in the following detailed description of illustrative embodiments to be taken in conjunction with the accompanying drawings, in which like reference numerals are used to identify the same or similar parts in the several views.

BRIEF DESCRIPTION OF THE DRAWINGS

FIG. 2 (formed of FIGS. 2A, 2B and 2C provided on three sheets of drawings so as to permit the use of a suitably large scale) is a flowchart to which reference is made in explaining an operation of the cordless telephone system of the present invention;

FIG. 4 (formed of FIGS. 4A, 4B and 4C provided on three sheets of drawings so as to permit the use of a suitably large scale) is a flowchart to which reference is made in explaining the present invention.

DETAILED DESCRIPTION OF THE PREFERRED EMBODIMENTS

The present invention will now be described with reference to the accompanying drawings.

Figure 1:
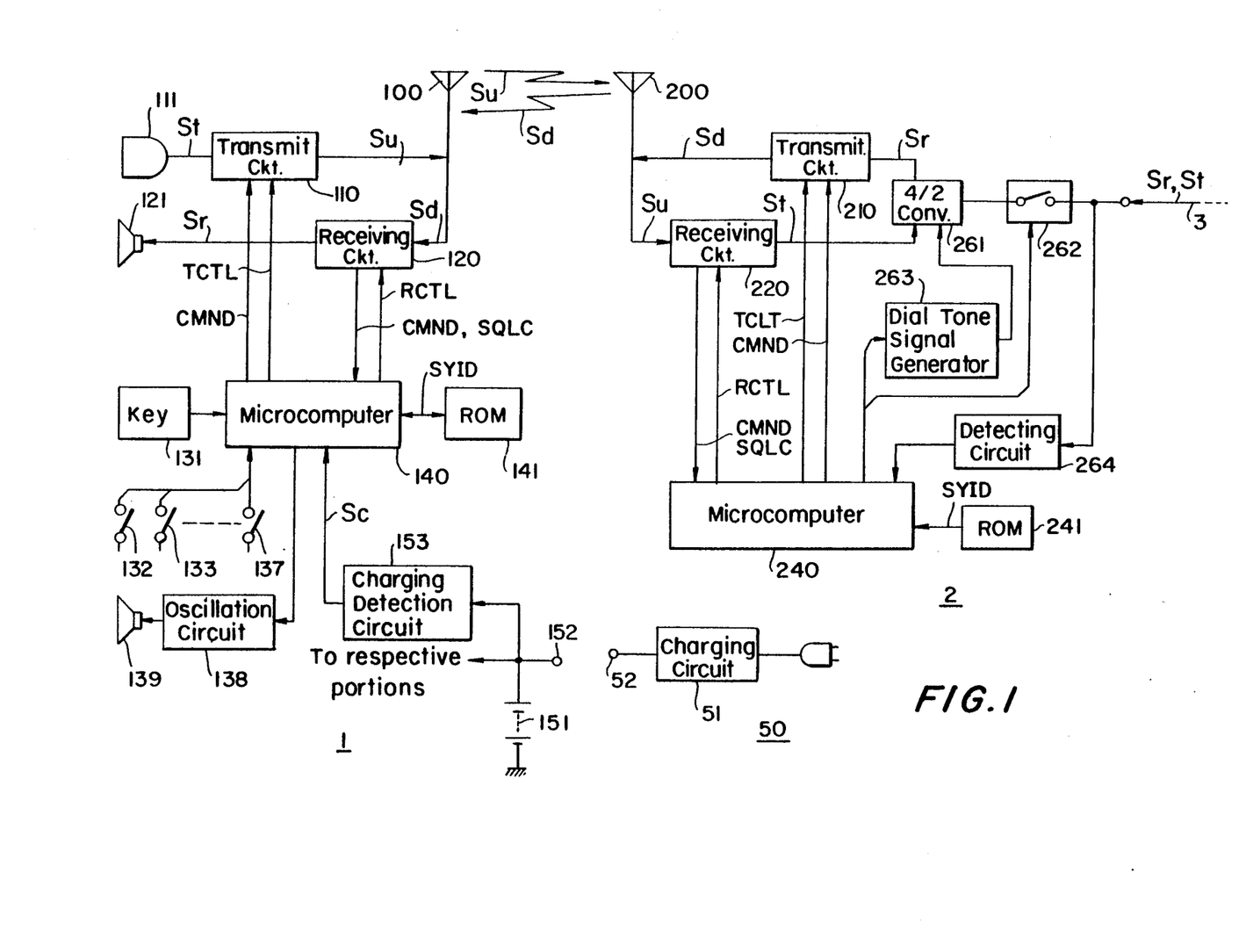
FIG. 1 is a schematic block diagram showing an overall circuit arrangement of an embodiment of a cordless telephone system according to the present invention.

FIG. 1 shows an overall arrangement of an embodiment of the cordless telephone system according to the present invention, wherein reference numeral 1 designates a handset unit, 2 a base unit, 3 a telephone line network (external line) and 50 a charging stand.

Referring to FIG. 1, in the handset unit 1, a transmitting circuit 110 is adapted to convert an audio signal St and a command signal CMND (which will be more fully referred to later) into an FM (frequency-modulated) up channel signal Su and transmit the same. A receiving circuit 120 is adapted to receive and demodulate an FM down channel signal Sd to provide an audio signal Sr and the command signal CMND. The receiving circuit 120 also detects limiter noise generated, for example, by an intermediate frequency amplifier to thereby derive a detection signal SQLC which indicates the presence or absence of the down channel signal Sd.

The handset unit 1 is provided with a dial key 131 and a talk key 132. The talk key 132 is of a non-lock type push switch so that, each time the talk key 132 is pressed, the handset unit 1 is alternately changed between the standby mode and the talk mode. In the standby mode, the handset unit 1 is in the standby mode for making an outgoing call therefrom and receives and monitors the down channel to await a connection request from the base unit 2. In the talk mode, the handset unit 1 performs continuous reception and transmission between it and the base unit 2.

The handset unit 1 is further provided with function keys 133 to 137 such as a hold key and so on. These function keys 133 to 137 are of non-lock type push switches and the keys 134, 135 and 136 are not shown for simplicity. Further, the handset unit 1 emanates provided with a speaker 139 from which a ringer sound is and a microcomputer 140 which is adapted to control the entire system of this handset unit 1.

Figure 2A:
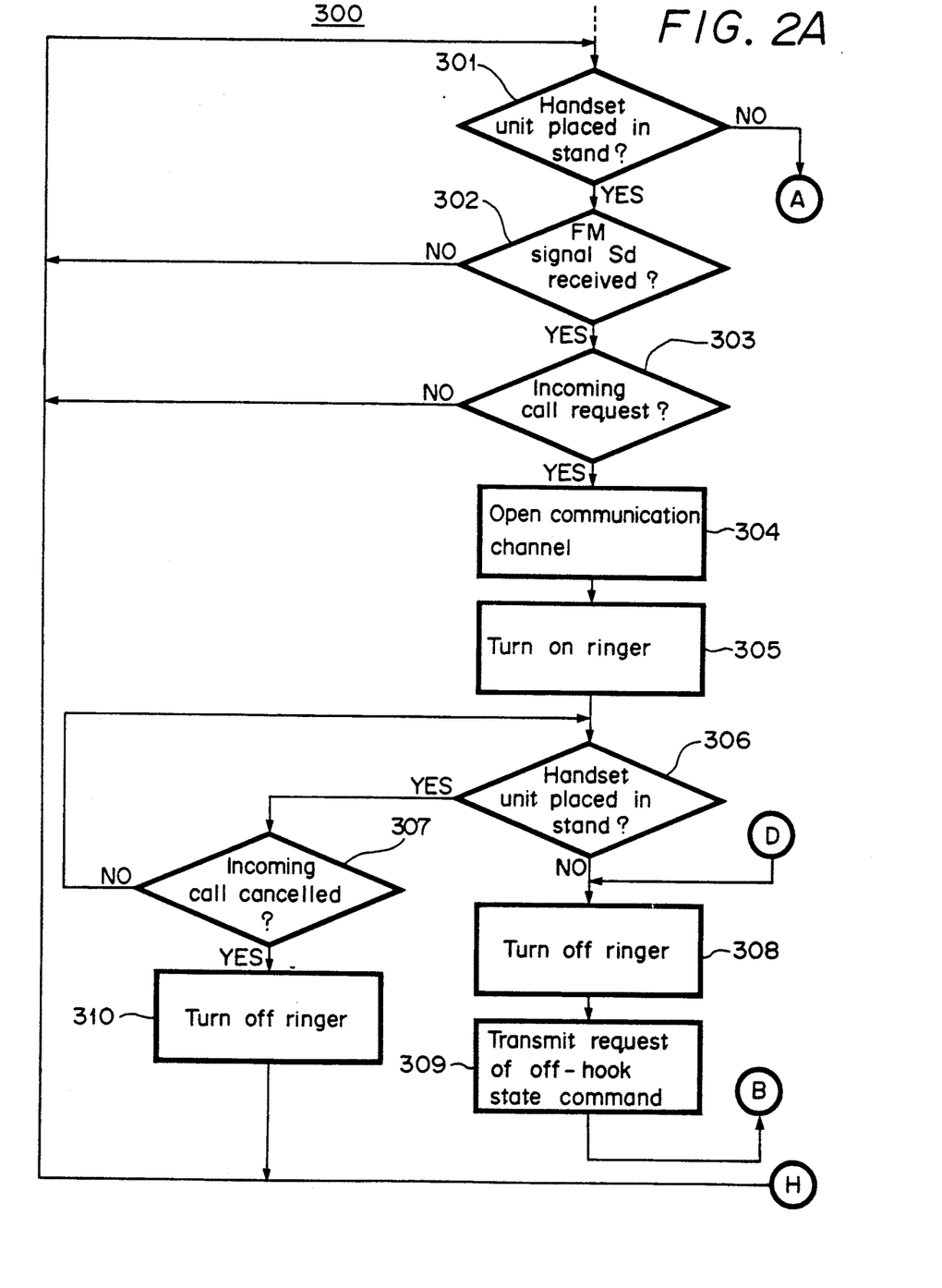
Figure 2B:
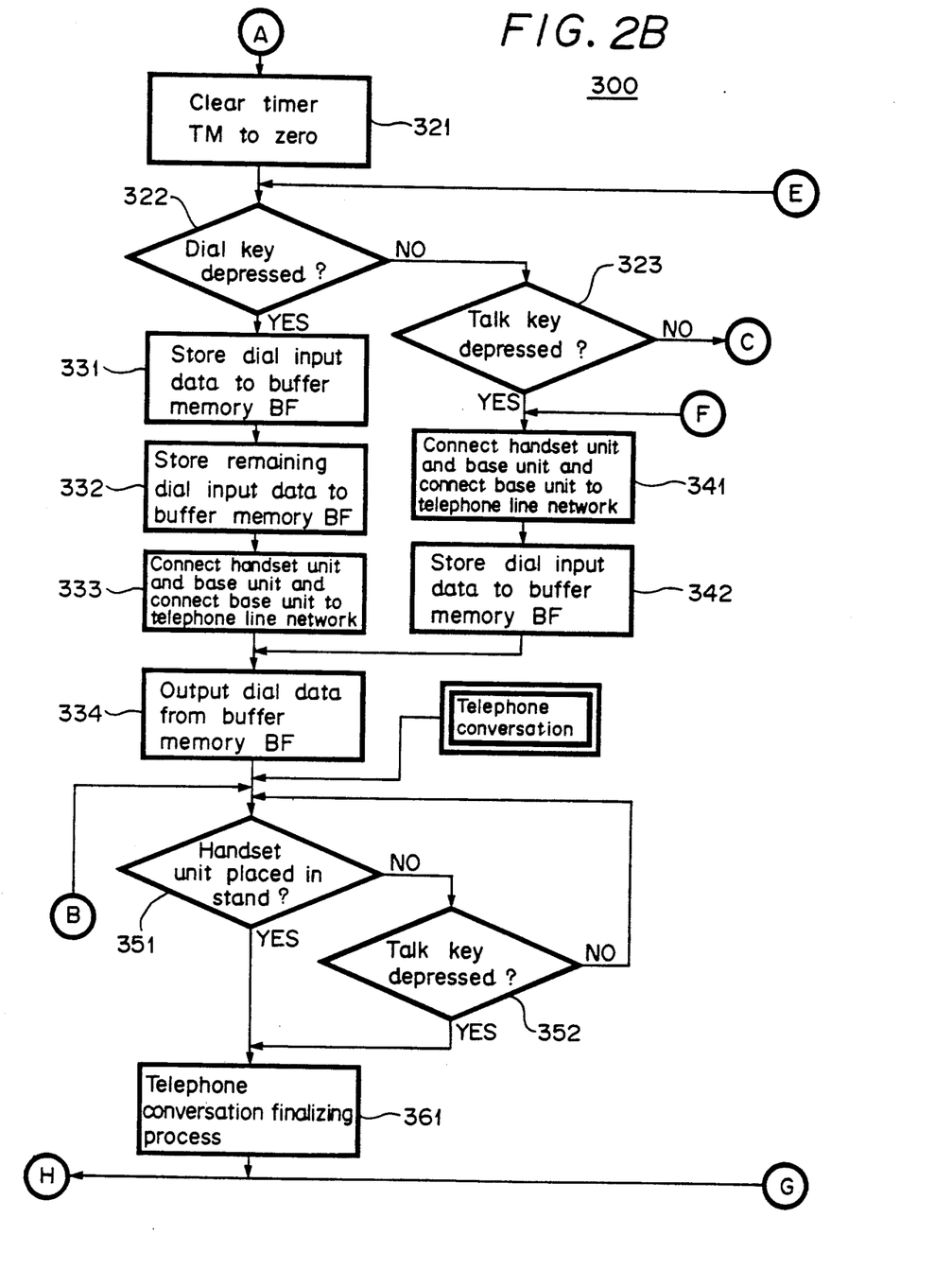
Figure 2C:
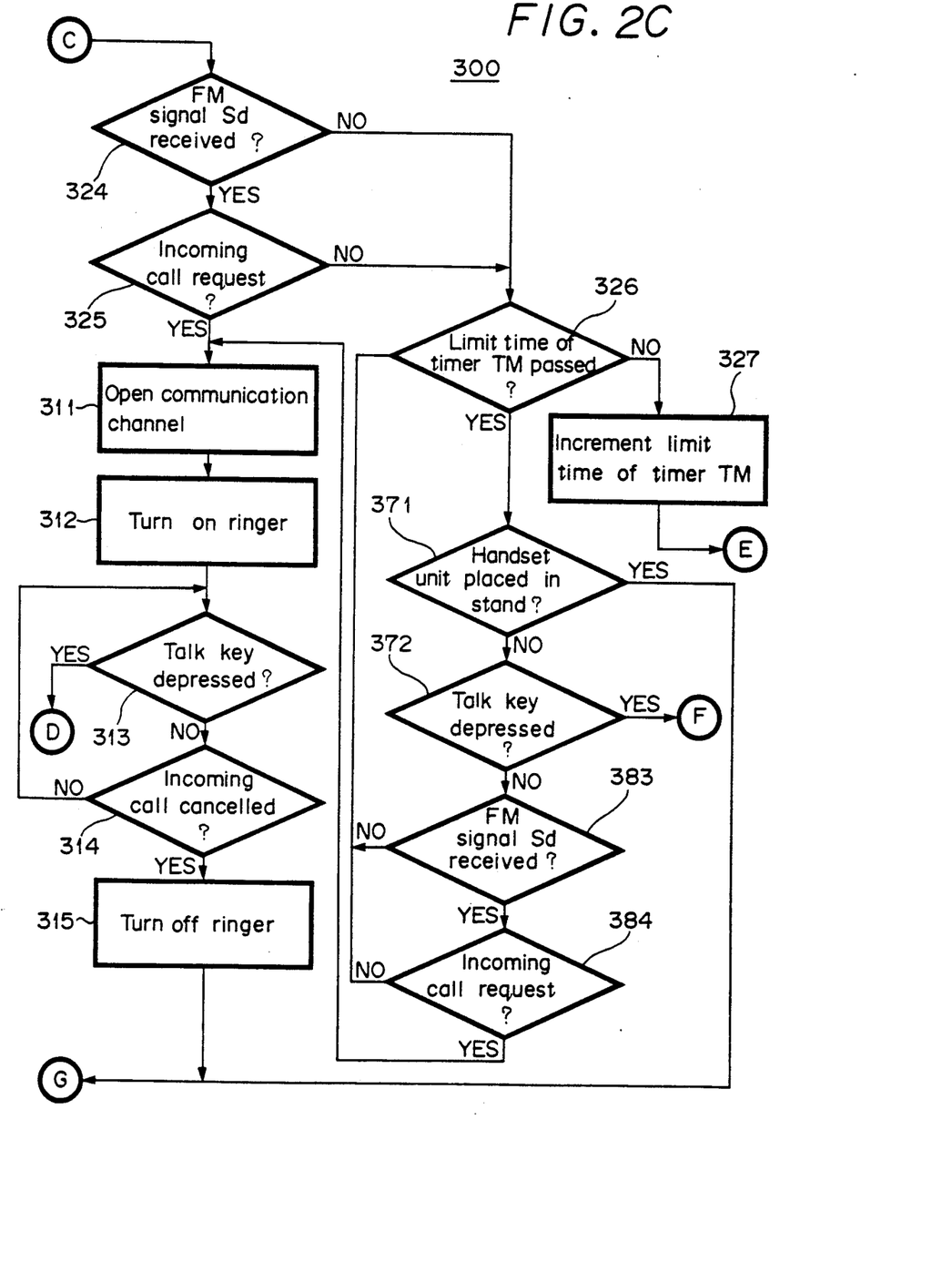

The microcomputer 140 is adapted to generate the command signal CMND that is transmitted via the transmitting circuit 110, and to identify the command signal CMND and the detection signal SQLC sent from the receiving circuit 120. Further, the microcomputer 140 generates control signals TCTL and RCTL by which the transmission and reception of the transmitting circuit 110 and the receiving circuit 120 are permitted and inhibited and the channel is designated. Furthermore, the microcomputer 140 stores therein a routine 300 shown in the flowchart of FIG. 2. In this case, FIG. 2 is formed of FIGS. 2A, 2B and 2C provided on three sheets of drawings so as to permit a suitably large scale thereof.

There is provided a memory 141 which might be a read only memory (ROM), and this ROM 141 stores therein a 25-bit system identifying code SYID used to distinguish this cordless telephone from other cordless telephones.

A battery 151 is provided as a power source and is a rechargeable battery such as a nickel-cadmium battery. An output voltage of this battery 151 is supplied to respective portions of the handset unit 1 as operation voltages. Reference numeral 152 designates a charging voltage input contact and 153 a charging detecting circuit.

In the charging stand 50, there is provided a charging circuit 51, and this charging circuit 51 converts a commercially available AC voltage into a predetermined DC voltage, this DC voltage being fed to a charging voltage output contact 52.

When the handset unit 1 is placed in the charging stand 50, the contacts 52 and 152 are brought in contact with each other, whereby the output voltage of the charging circuit 51 is supplied to the battery 151, so that the battery 151 is charged. When the user picks up the handset unit 1 from the charging stand 50, the contacts 52 and 152 are disconnected to inhibit the battery 151 from being charged. The detecting circuit 153 detects whether or not the battery 151 is charged. In other words, a detection output Sc from the detecting circuit 153 is used to detect whether or not the handset unit 1 is placed in the charging stand 50.

The base unit 2 includes a transmitting circuit 210 and a receiving circuit 220 which are similar to the transmitting circuit 110 and the receiving circuit 120 in the handset unit 1. In the standby mode, the base unit 2 awaits the arrival of an incoming call from the telephone line network 3, and the receiving circuit 220 awaits a connection request from the handset unit 1 by receiving and monitoring the up channel signal. In the talk mode, the base unit 2 performs continuous reception and transmission between it and the handset unit 1.

In the base unit 2, there is provided a microcomputer 240 that is used to control the entirety of this cordless telephone system. That is, this microcomputer 240 performs processing similar to that of the microcomputer 140 and also controls the operation of the entirety of this cordless telephone system. A ROM 241 corresponds with the ROM 141 of the handset unit 1 and in stores the system identifying code SYID.

Further, reference numeral 261 designates a four-to-two line converting circuit, 262 a switch circuit which corresponds with the hook switch of the standard telephone set, 263 a dial tone signal (i.e. DTMF signal) generating circuit and 264 a ring tone signal detecting circuit.

In this embodiment, the base unit 2 is not provided with the charging circuit for the battery 152 of the handset unit 1.

Figure 3:
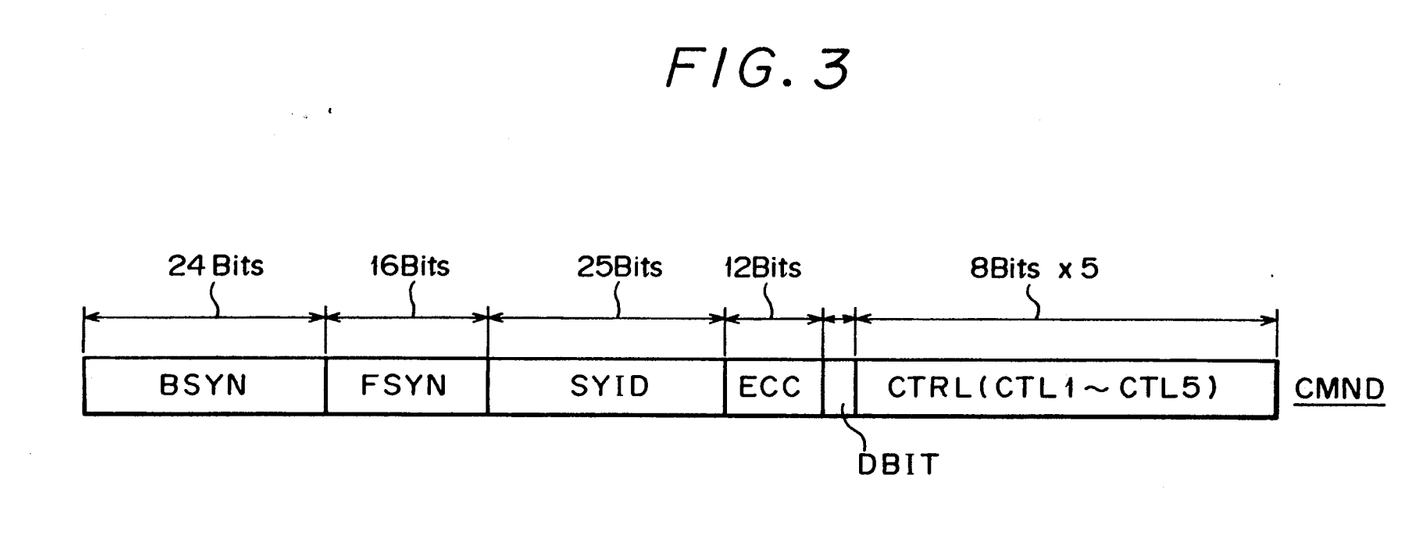
FIG. 3 is a diagram of a signal format to which reference is made in explaining the operation of the present invention.

FIG. 3 shows an example of a signal format of the command signal CMND. This command signal CMND includes a bit synchronizing (sync.) signal BSYN of 24 bits at the head thereof and a frame sync. signal FSYN thereafter. In that case, these signals BSYN and FSYN have particular bit patterns expressed as BSYN = "101010 . . . 10"
FSYN = "1100010011010110" . . . up channel
FSYN = "1001001100110110" . . . down channel Further, the command signal CMND includes a system identifying code SYID of 25 bits succeeding the signal FSYN, an error correcting code ECC of 12 bits for the system identifying code SYID, a dummy bit DBIT of 3 bits and a control code CTRL of 5 bytes, in that order. In this case, in the control code CTRL, a first byte CTL1 is assigned to the code that indicates the control contents of the handset unit 1 and the base unit 2 and second to fifth bytes CTL2 to CTL5 are parameters and data that are associated with the first byte CTL1.

When the handset unit 1 or the base unit 2 receives the command signal CMND, it is determined by the microcomputer 140 or 240 whether or not the identifying code SYID involved in that command signal CMND is identical with the identifying code SYID stored in the ROM 141 or 241 thereof. Only when the identifying codes SYID are identical, the command signal CMND is made effective, while when the identifying codes SYID are not coincident with each other, the command signal CMND is made ineffective.

In the standby mode of the quick talk mode, the handset unit 1 is placed in the charging stand 50 and the battery 151 is charged by the output voltage of the charging circuit 51. At that time, steps 301 to 303 of the routine 300 are repeatedly executed by the microcomputer 140.

More specifically, referring to FIG. 2A, by observing the detection output Sc of the detecting circuit 153, it is determined at step 301 whether or not the handset unit 1 is placed in the stand 50. In that case, since the handset unit 1 is placed in the stand 50, then processing proceeds from step 301 to the next decision step 302. It is determined in decision step 302 by observing the detection signal SQLC whether or not the FM signal Sd from the base unit 2 is received by the handset unit 1. If the FM signal Sd is not received by the handset unit 1 as represented by a NO at step 302, then processing returns from step 302 to step 301.

If on the other hand the FM signal Sd is received by the handset unit 1 as represented by a YES at step 302, then processing proceeds from step 302 to the next decision step 303. In decision step 303, the FM signal Sd is demodulated to provide the command signal CMND, and it is determined whether or not the system identifying code SYID involved in this command signal CMND is identical with the system identifying code SYID stored in the ROM 141 and also it is determined whether or not this command signal CMND is identical with the command signal CMND whose control code CTRL indicates a request of an incoming call. If the control code CTRL of this command signal CMND does not indicate an incoming call request as represented by a NO at step 303, then the processing returns from step 303 to step 301. Accordingly, when the handset unit 1 is placed in the stand 50, this state of the handset unit 1 and the occurrence of an incoming call request are monitored.

Let us explain an operation in which the user makes an outgoing call in the standard quick talk mode.

When the user picks up the handset unit 1 from the stand 50, this is detected at step 301 on the basis of the detecting signal Sc and processing proceeds from step 301 to step 321 (see FIG. 2B). In step 321, a timer TM implemented by software is cleared to [0] and then the loop formed of steps 322, 323, 324, 325, 326 and 327 is repeatedly executed.

More specifically, as shown in FIG. 2B, it is determined in decision step 322 whether or not the dial key 131 is depressed. If the dial key 131 is not pressed as represented by a NO at step 322, then processing proceeds from step 322 to the next decision step 323. It is determined in decision step 323 whether or not the talk key 132 is depressed. If the talk key 132 is not pressed as represented by a NO at step 323, then processing proceeds from step 323 to the next decision step 324.

In decision step 324 and the next decision step 325, similarly to steps 302 and 303, it is determined whether or not the request of the incoming call from the base unit 2 is received by the handset unit 1. If not, the processing proceeds from step 324 or 325 to the next decision step 326. It is determined in decision step 326 whether or not a predetermined time limit of the timer TM, for example, 20 seconds, has passed. If 20 seconds has not yet passed as represented by a NO at step 326, then processing proceeds from step 326 to step 327, whereat time limit of the timer TM is incremented by a predetermined time. Then, processing returns from step 327 to step 322.

Accordingly, when the user picks up the handset unit 1 from the stand 50, the loop of steps 322 to 327 is repeated until the time limit of the timer TM, for example, 20 seconds, has passed.

If the user presses the numeral key of the dial key 132 to input the first digit of the phone number to be called during the loop of steps 322 to 327, then this depression of the numeral key is detected in step 322, and processing proceeds from step 322 to step 331. In step 331, data of the first digit of the phone number is stored in a buffer memory BF (not shown) of the microcomputer 140. Further, if the user depresses the numeral key of the dial key 131 to input the second digit and the following digits of the phone number to be called, then data of the numerals of the phone number to be called are sequentially stored in the buffer memory BF of the microcomputer 140 in step 332.

If the user inputs all data of the phone number to be called (e.g., if the input of the dial key 131 is interrupted for three seconds), then processing proceeds from step 332 to step 333.

In step 333, transmission by the transmitting circuit 110 is permitted and a command signal CMND whose control code CTRL indicates an outgoing call request is generated and supplied to the transmitting circuit 110, in which it is converted into the FM up channel signal Su. This FM signal Su is transmitted through an antenna 100 to the base unit 2.

In the base unit 2, the signal (radio wave) Su is received at an antenna 200 and the FM signal Su is demodulated by the receiving circuit 220 to provide the command signal CMND. This command signal CMND is supplied to the microcomputer 240 which then determines whether or not the system identifying signal SYID involved in that command signal CMND is identical with the system identifying code SYID stored in the ROM 241.

In that case, since the system identifying codes SYID are coincident with each other and the control code CTRL involved in the command signal CMND indicates a request for an outgoing call, the microcomputer 240 permits the transmitting circuit 210 to transmit the down channel signal which is paired with the channel through which the FM signal Su is received. Thereafter, a predetermined command signal CMND is accessed between the base unit 2 and the handset unit 1 to thereby open a communication channel between the base unit 2 and the handset unit 1.

Further, in the base unit 2, the switch circuit 262 is placed in the off-hook state to connect the transmitting circuit 210 and the receiving circuit 220 to the telephone line network 3 through the converting circuit 261 and the switch circuit 262.

As described above, in step 333, the handset unit 1 and the base unit 2 are connected to each other via the channels of the FM signals Su and Sd and the base unit 2 is connected to the telephone line network 3. Thus, the handset unit 1 is connected via the base unit 2 to the telephone line network 3.

If the handset unit 1 is connected via the base unit 2 to the telephone line network 3, then processing proceeds to step 334. In step 334, data of the phone number to be called stored in the buffer memory BF are sequentially read out, and a command signal CMND whose control code CTRL indicates the transmission of the phone number and the phone number of the other party is generated, this command signal CMND being transmitted to the base unit 2.

Accordingly, in the base unit 2, the command signal CMND is generated by the receiving circuit 220 and the control code CTRL of this command signal CMND indicates the transmission of the telephone number and the phone number to be called so that the microcomputer 240 controls the generating circuit 263 in accordance with the phone number to generate a dial tone signal corresponding to the phone number transmitted from the handset unit 1. This dial tone signal is transmitted through the converting circuit 261 and the switch circuit 262 to the telephone line network 3.

Therefore, the user can make an outgoing call by picking up the handset unit 1 from the stand 50 and by depressing the dial key 131 to input the phone number to be called, or the user can make an outgoing call by the cordless telephone similarly to the standard telephone set.

If the called phone is answered, the audio signal Sr from the other party is supplied to the transmitting circuit 210 via the signal line formed of the telephone line network 3, the switch circuit 262 and the converting circuit 261, in which this signal Sr is converted into the FM down channel signal Sd, this signal Sd being transmitted from the antenna 200.

This signal Sd is received by the handset unit 1 and the receiving circuit 120 derives the audio signal Sr, this audio signal Sr being fed to the telephone receiver 121.

In transmission, the audio signal St from the telephone transmitter 111 is supplied to the transmitting circuit 110, in which it is converted into the up channel FM signal Su, this signal Su being transmitted to the base unit 2 from the antenna 100.

The transmitted signal Su is received by the base unit 2 and the receiving circuit 220 derives the signal St. This signal St is transmitted through the converting circuit 261 and the switch circuit 262 to the telephone line network 3, thereby being transmitted to the phone of the other party. Therefore, the communication channel is opened between the handset unit 1 and the base unit 2, thus making it possible for the user to carry out make a telephone conversation between the called party and the handset unit 1 from now on.

During the telephone conversation, steps 351 and 352 are repeated.

More specifically, as shown in FIG. 2, processing by the microcomputer 140 proceeds from step 334 to the next decision step 351, whereat it is determined by observing the detection signal Sc whether or not the handset unit 1 is placed in the stand 50. If the handset unit 1 is not placed in the stand 50 as represented by a NO at step 351, or during the telephone conversation, then processing proceeds from step 351 to the next decision step 352. In step 352, it is determined whether or not the talk key 132 is depressed. If the talk key 132 is not depressed as represented by a NO at step 352, then processing returns from step 352 to step 351. Therefore, during the telephone conversation, it is determined by the monitoring process whether or not the handset unit 1 is placed in the stand 50 or it is also determined by the monitoring process whether or not the talk key 132 is depressed.

When the telephone conversation is finished and the user places the handset unit 1 in the stand 50, this status of the handset unit 1 on the stand 50 is detected at step 351, and processing proceeds from step 351 to step 361. In step 361, a command signal CMND whose control code CTRL indicates the end of the telephone conversation is generated, and this command signal CMND is transmitted to the base unit 2. Also, the transmitting circuit 120 is inhibited from transmitting the signal, or the telephone conversation finalizing process is executed and then the processing returns from step 361 to step 301. Therefore, when the user places the handset unit 1 in the stand 50 after the telephone conversation is finished, the handset unit 1 is set in the standby mode.

Further, in the base unit 2, the command signal CMND whose control code CTRL indicates the finalizing process of telephone conversation is transmitted thereto from the handset unit 1, whereby the transmitting circuit 210 is inhibited from transmitting the signal and the switch circuit 262 is placed in the on-hook state and so on. That is, the conversation finalizing process is performed, and then the base unit 2 is set in the standby mode.

Accordingly, when the user places the handset unit 1 in the stand 50 after the telephone conversation is finished, the handset unit 1 and the base unit 2 are set in the standby mode. In other words, the user can finish the telephone conversation by placing only the handset unit 1 in the stand 50 similarly to the standard telephone set.

Upon standby mode in the quick talk mode, if an incoming call arrives through the telephone line network 3, its ring tone signal is detected by the detecting circuit 264 and this detected signal is supplied to the microcomputer 240.

Then, the transmission operation of the transmitting circuit 210 is permitted and a command signal CMND whose control code CTRL indicates the incoming call request is generated. An FM signal Sd including this command signal CMND is transmitted to the handset unit 1.

In the handset unit 1, the FM signal Sd is received at the antenna 100 and the reception of the FM signal Sd is detected at decision step 302 so that processing proceeds from step 302 to the next decision step 303. In step 303, it is determined whether or not the system identifying codes SYID are coincident with each other. In that case, since the system identifying codes SYID are coincident with each other and the control code CTRL in the command signal CMND indicates an incoming call request, this request is detected at decision step 303, and then processing proceeds from step 303 to step 304.

In step 304, the transmitting circuit 110 is permitted to transmit the up channel signal which is paired with the down channel through which the FM signal Su is received, whereby a predetermined command signal CMND is accessed between the base unit 2 and the handset unit 1 to open the communication channel between the base unit 2 and the handset unit 1 from now on.

Then, processing proceeds from step 304 to step 305. In step 305, the microcomputer 140 controls the oscillation circuit 138 to generate a ring signal, and this ring signal is supplied to the speaker 139 which emits a ringing sound to announce the arrival of the incoming call.

Subsequently, processing proceeds from step 305 to the next decision step 306, and steps 306 and 307 are repeated until the user picks up the handset unit 1 from the stand 50.

More specifically, by studying the detection signal Sc in step 306, it is determined whether or not the handset unit 1 is picked up from the stand 50. If the handset unit 1 is not picked up from the stand 50 as represented by a NO at step 306, then processing proceeds from step 306 to the next decision step 307. It is determined in step 307 whether or not a command signal CMND whose control code CTRL indicates a cancellation of the incoming call is transmitted from the base unit 2. If the command signal CMND is not transmitted from the base unit 2 as represented by a NO at step 307, then processing returns from step 307 to step 306.

When a ringing sound is emitted to announce the arrival of the incoming call and the user picks up the handset unit 1 from the stand 50, this is detected at step 306 on the basis of the detection signal Sc, and then processing proceeds from step 306 to 308. In step 308, the oscillation circuit 138 is inhibited from generating the ring signal and the speaker 139 stops emitting the ringing sound. In the next step 309, a command signal CMND whose control code CTRL indicates a request for the off-hook state is generated and this command signal CMND is transmitted to the base unit 2 via the up communication channel.

Then, in the base unit 2, the switch circuit 262 is placed in the off-hook state in accordance with the transmitted command signal CMND.

Accordingly, the telephone line network 3 is connected to the transmitter 111 and the receiver 121 through the base unit 2 and the handset unit 1, thus making it possible for the user to carry out a telephone conversation with the other party.

More specifically, the user can receive an incoming call by picking up the handset unit 1 from the stand 50, or the user can receive an incoming call in a manner similar to a standard telephone set.

During telephone conversation, the processing of the microcomputer 140 proceeds from step 309 to step 351 and the steps 351 and 352 are repeated as described above.

Incidentally, when the other party terminates an incoming call and places his handset unit in the on-hook state while the steps 306 and 307 are being repeated, the ring tone signal supplied from the telephone line network 3 to announce the arrival of the incoming call is not detected by the detecting circuit 264 any more, whereby a command signal CMND whose control code CTRL indicates cancellation of the incoming call is generated in the base unit 2 and this command signal CMND is transmitted to the handset unit 1.

Then, this command signal CMND is detected in decision step 307, and processing proceeds from step 307 to step 310, whereat the oscillation circuit 138 is inhibited from generating a ring signal and the speaker 139 stops emitting a ringing sound. Thereafter, the processing returns from step 310 to step 301, whereat the handset unit 1 is placed in the standby mode again.

Let us now explain the process that takes place when the talk key 132 is depressed while the loop of steps 322 to 327 is being repeated.

More specifically, if the talk key 132 is depressed while the loop of steps 322 to 327 is being repeated, this depression of the talk key 132 is detected in step 323, and processing proceeds from step 323 to step 341. In step 341, similarly to step 333, a process to open the communication channel between the handset unit 1 and the base unit 2 is executed, while in the base unit 2 the off-hook process is executed so that the handset unit 1 is connected to the telephone line network 3 via the base unit 2. Then, processing proceeds from step 341 to step 342.

In step 342, if the user operates the dial key 131 to input data of the phone to be called, then data are sequentially stored in the buffer memory BF. If the user inputs all data of the phone to be called, then the processing proceeds from step 342 to step 334.

Accordingly, in step 334, the dial tone signal corresponding to the phone number to be called is transmitted to the telephone line network 3 so that, if the called phone is answered, the telephone conversation can be carried out as described above. In that case, similarly to the standard cordless telephone, the user can make an outgoing call by means of the talk key 132.

Let us explain the process that takes place when an incoming call is received while the loop of steps 322 to 327 is being repeated.

More specifically, if the incoming call is received via the telephone line network 3 while the loop of steps 322 to 327 is being repeated, in the base unit 2, the ring tone signal of this incoming call is detected by the detecting circuit 264. On the basis of this detected signal, a command signal CMND whose control code CTRL indicates the incoming call request is generated and this command signal is transmitted to the handset unit 1.

Then, in the handset unit 1, this transmission of the command signal CMND is detected at decision step 325, and then processing proceeds from step 325 to step 311. In step 311, similarly to step 304, a communication channel is opened between the handset unit 1 and the base unit 2 and similarly to step 305, the speaker 139 emits the ringing sound announcing the arrival of the incoming call in step 312. Then, steps 313 and 314 are repeated.

It is determined in step 313 whether or not the talk key 132 is depressed. If the talk key 132 is not depressed as represented by a NO at step 313, then processing proceeds from step 313 to the next decision step 314. In step 314, similarly to step 307, it is determined whether or not the command signal CMND whose control code CTRL indicates cancellation of the incoming call is transmitted from the base unit 2. If such command signal CMND is not transmitted from the base unit 2 as represented by a NO at step 314, then processing returns from step 314 to step 313. Accordingly, if an incoming call is received, the ringing tone to indicate the call emanates from the speaker 139 and the talk key 132 is monitored from now on.

When the ringing sound is emits to announce the arrival of the incoming call and the user presses the talk key 132, this fact is detected in step 313 and then processing proceeds from step 313 to step 308.

Therefore, the ringer is turned OFF in step 308 and the base unit 2 and the telephone line network 3 are connected to each other in step 309, thus enabling the user to carry out a telephone conversation with the other party.

To be more concrete, as the loop of steps 322 to 327 is repeated after the user has picked up the handset unit 1 from the stand 50, if the incoming call is received, the user can receive the call by pressing the talk key 132.

If the other party terminates the incoming call and places his handset unit in the state, this on-hook state is detected in step 314 similarly to step 307, and then processing proceeds from step 314 to step 315. In step 315, similarly to step 310, the speaker 139 stops emitting the ringing sound and then processing returns to step 301, whereat the handset unit 1 is again placed in the standby mode.

A cancel operation of the quick talk mode will be explained below and this is the case such that the handset unit 1 is set in the normal standby mode while the handset unit 1 is not placed in the stand 50.

If the dial key 131 or the talk key 132 is not pressed after the handset unit 1 is picked up from the stand 50, then the loop of steps 322 to 327 is repeated. If 20 seconds pass after the user picks up the handset unit 1 from the stand 50, this is detected at decision step 326 and processing proceeds from step 326 to the next decision step 371. Thereafter, steps 371, 372, 383 and 384 are repeated to keep the handset unit 1 in the normal standby mode.

More specifically, similarly to step 301, it is determined in decision step 371 whether or not the handset unit 1 is placed in the stand 50. If the handset unit 1 is not placed in the stand 50 as represented by a NO at step 371, then processing proceeds from step 371 to the next decision step 372. It is determined in step 372 whether or not the talk key 132 is depressed. If the talk key 132 is not depressed as represented by a NO at step 372, then processing proceeds from step 372 to step 383. Then, similarly to steps 302 and 303, it is determined in step 383 and the next decision step 384 whether the command signal CMND whose control code CTRL indicates an incoming call request is transmitted from the base unit 2. if not, then processing returns from step 383 or 384 to decision step 371.

Accordingly, if the handset unit 1 is not placed in the stand 50 such as when the handset unit 1 is picked up from the stand 50 or when the handset unit 1 is off the stand 50 and the predetermined limit time of the timer TM, e.g., 20 seconds have elapsed, then the loop of steps 371, 372, 383 and 384 is repeated.

When the loop of steps 371 to 384 is repeated, as will be clear from the following explanation, the quick talk function of this cordless telephone system is cancelled, and the handset unit 1 is placed in the normal standby mode. In other words, if 20 seconds have passed after the handset unit 1 is off the stand 50, then the handset unit 1 is placed in the standby mode.

If the talk key 132 is pressed as the loop of steps 371 to 384 is repeated, then the depression of the talk key 132 is detected at decision step 372 and processing proceeds from step 372 to step 341. Therefore, in step 341, the handset unit 1 and the base unit 2 are connected to each other and the base unit 2 is connected to the telephone line network 3 so that, if the user inputs the phone number to be called by the dial key 131 in step 342, this input data is transmitted to the telephone line network 3 from the handset unit 1 through the base unit 2. If the called phone is answered, then the user can communicate with the other party. In other words, a normal outgoing call can be made by means of the talk key 132.

If an incoming call arrives via the telephone line network 3 during the loop of steps 371 to 384, the command signal CMND whose control code CTRL indicates the incoming call request is transmitted to the handset unit 1 from the base unit 2, and this transmission of the command signal CMND is detected at steps 383 and 384. Then, processing proceeds from step 384 to step 311. Accordingly, in step 311, the base unit 2 and the handset unit 1 are connected together as described above. Thereafter, if the talk key 132 is pressed, in step 309 the base unit 2 is connected to the telephone line network 3, thus enabling telephone communication with the other party. That is, the incoming call can be received normally by the use of the talk key 132.

If the talk key 132 is depressed at the completion of the telephone conversation, then this depression of the talk key 132 is detected at decision step 352 and processing proceeds from step 352 to the next decision step 361, wherein the telephone conversation finalizing processing is performed. Thereafter, processing proceeds to the loop of steps 301, 321, 322, 323 to 327 and the loop of steps 371, 372 to step 384, in that order.

Accordingly, if the talk key 132 is depressed at the completion of the telephone conversation, the loop of steps 322 to 327 is executed for 20 seconds and the handset unit 1 and the base unit 2 are placed in the normal standby mode.

As processing proceeds from step 361 to the loop of steps 371 to 384, the loop of steps 322 to 327 is executed for 20 seconds. If the talk key 132 is depressed, the user can make an outgoing call or the user can receive an incoming call by the above-mentioned auxiliary outgoing call processing (steps following step 323) or by the above-mentioned auxiliary incoming call processing (steps following step 325).

If the handset unit 1 is placed on the stand 50 as the loop of steps 371 to 384 is repeated, then this change of the state of the handset unit 1 is detected at decision step 371, and processing returns from step 371 to step 301. Accordingly, the loop of steps 301 to 303 is repeated to thereby place the handset unit 1 in the standby state of the quick talk mode.

Owing to the above-mentioned processing, even after the telephone conversation is made by the talk key 132, the cordless telephone system of the present invention can be changed from the normal standby mode to the standby mode of the quick talk mode by placing the handset unit 1 on the stand 50.

In this fashion, according to the first embodiment of the present invention, the quick talk function of the cordless telephone can be realized. In that case, particularly in accordance with the first embodiment, when the user picks up the handset unit 1 from the stand 50, if the user wants to receive an incoming call, the communication channel is opened between the handset unit 1 and the base unit 2 unconditionally. In that case, if the user wants to make an outgoing call, only when data is input by a predetermined key such as the dial key 131 or the talk key 132, the communication channel is opened between the handset unit 1 and the base unit 2 and then the base unit 2 is connected to the telephone line network 3. Accordingly, the communication channel is prevented from being occupied meaninglessly during the period in which the user picks up the handset unit 1 from the stand 50 and inputs data by the predetermined key in order to make an outgoing call. Therefore, other cordless telephones can be protected from disturbance.

The cordless telephone system of the first embodiment, however, cannot avoid the following shortcomings. That is, when the user wants to make an outgoing call, if the dial key 131 is depressed, then the communication channel is opened between the handset unit 1 and the base unit 2 and then the base unit 2 is connected to the telephone line network 3. As a result, it takes a lot of time to connect the handset unit 1 to the telephone line network 3 in actual practice, which makes the cordless telephone system inconvenient. Therefore, a second embodiment of the present invention is intended to solve the aforenoted problems.

In the second embodiment, when the handset unit 1 is picked up, for example, from the charging stand 50, a communication channel is opened between the handset unit 1 and the base unit 2, and at that time, the base unit 2 is not connected to the telephone line network 3. If a predetermined key such as the dial key 131 and so on is operated, then the base unit 2 is connected to the telephone line network 3. This second embodiment will be explained with reference to FIGS. 1 to 4.

Figure 4A:
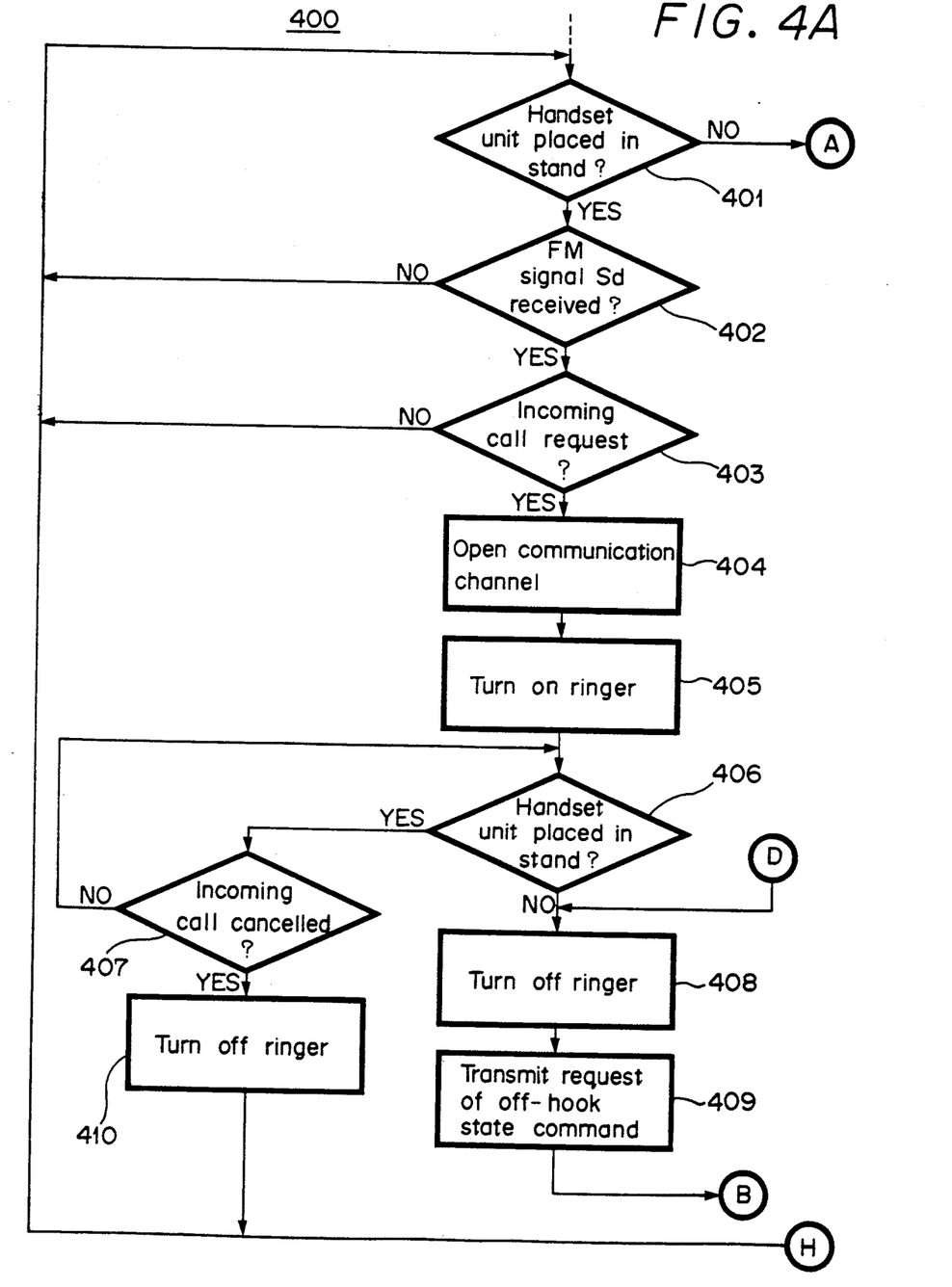
Figure 4B:
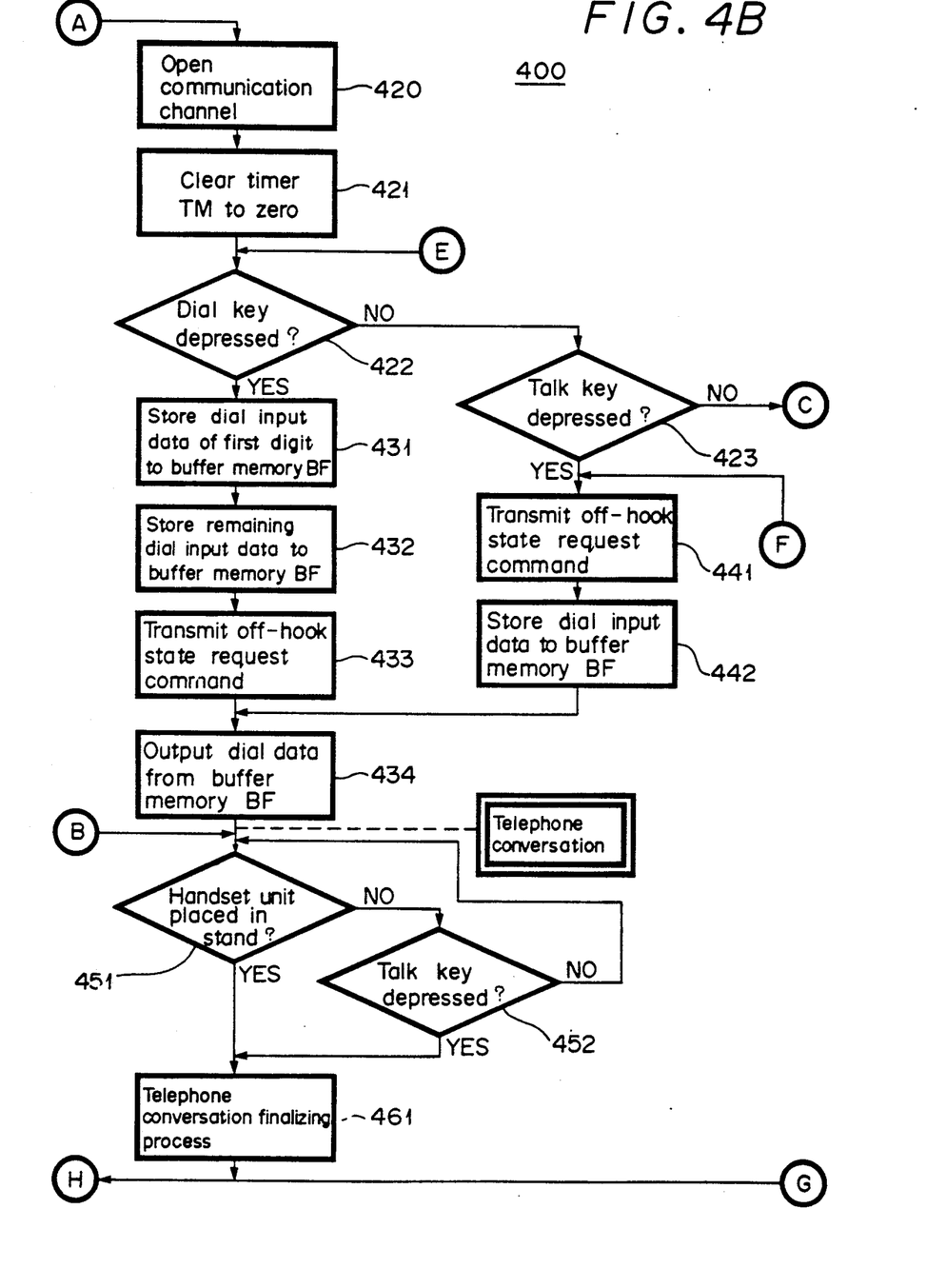
Figure 4C:
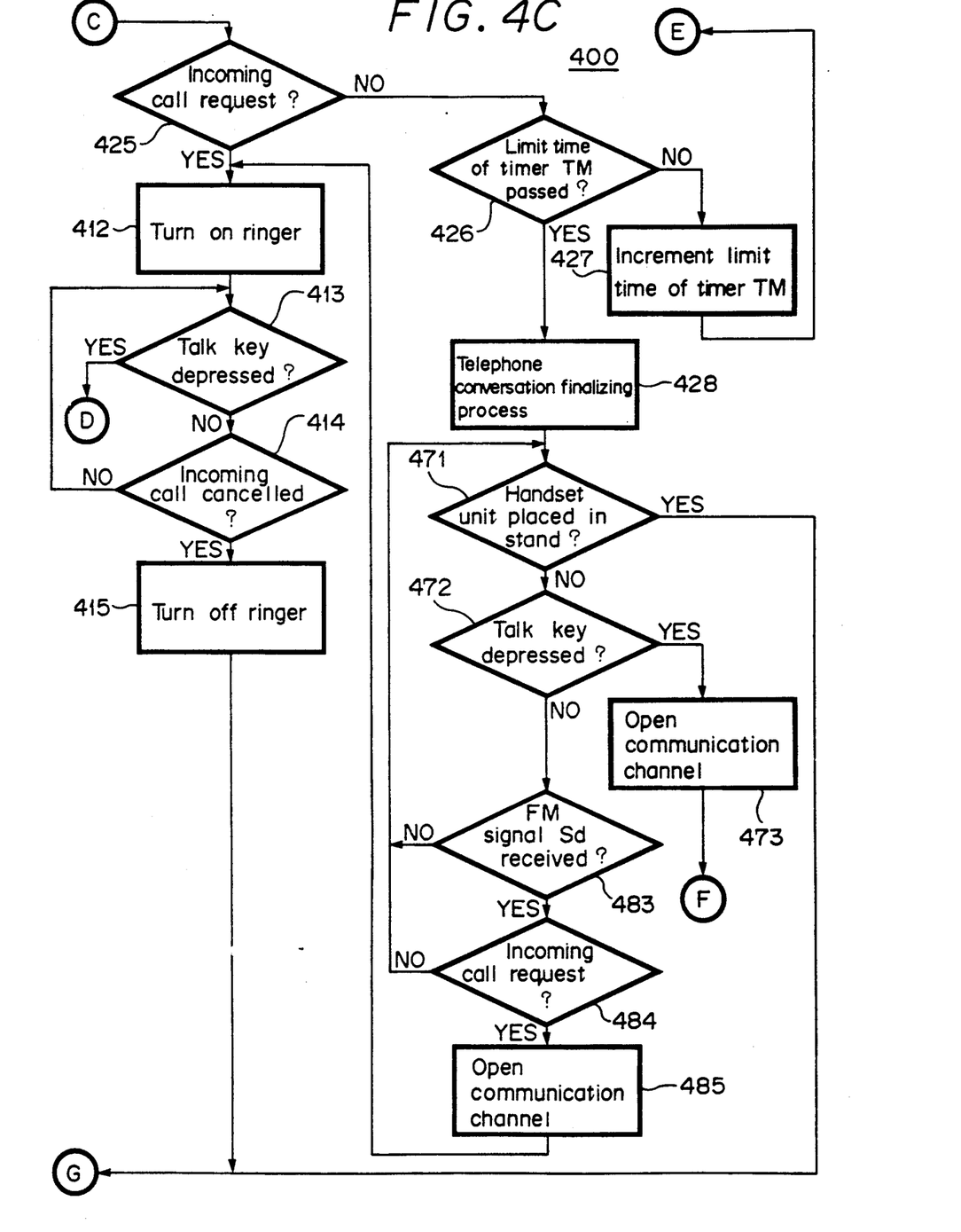

The block diagram of FIG. 1 and the signal format of FIG. 3 of the second embodiment are substantially the same as those of the first embodiment. Incidentally, in the case of the second embodiment, a routine 400 prepared in the microcomputer 140 of the block diagram of FIG. 1 is represented in FIG. 4 (FIG. 4 is formed of FIGS. 4A, 4B and 4C provided on three sheets of drawings so as to permit the use of a suitably large scale thereof).

The standby state in the quick talk mode will be explained below. In this case, similarly to the preceding paragraph of the standby mode in the quick talk mode wherein steps 301 to 303 of the routine 300 are repeated, steps 401 to 403 of the routine 400 are repeated and corresponding steps in the routine 300 are replaced with steps of the routine 400. Therefore, respective steps of the routine 400 need not be described in detail.

Let us first explain the case where a user makes an outgoing call in the quick talk mode. This is the operation in which the user makes an outgoing call in the standard quick talk mode.

Referring to FIG. 4, if the user picks up the handset unit 1 from the stand 50, then this change of status of the handset unit 1 is detected at decision step 401 on the basis of the detection signal Sc. Then, processing proceeds from step 401 to step 420, whereat the transmission operation of the transmitting circuit 110 is permitted and a command signal CMND whose control code CTRL indicates a connection request (request for opening a channel) is generated and this command signal CMND is supplied to the transmitting circuit 110, in which it is converted into the FM up channel signal Su. This FM signal Su is transmitted to the base unit 2 via the antenna 100.

In the base unit 2, the signal (radio wave) Su is received at the antenna 200 and the FM signal Su is demodulated by the receiving circuit 220 to provide the command signal CMND. This command signal CMND is supplied to the microcomputer 240 which then determines whether or not the system identifying code SYID involved in the command signal CMND is identical with the system identifying code SYID stored in the ROM 241.

In that case, since the system identifying codes SYID are coincident with each other and the control code CTRL of the command signal CMND indicates the connection request, the microcomputer 240 permits the transmitting circuit 210 to transmit a signal on the down channel which is paired with the up channel through which the FM signal Su is received, and then a predetermined command signal CMND is accessed between the base unit 2 and the handset unit 1, so that a communication channel is opened between the base unit 2 and the handset unit 1.

Then, processing proceeds from step 420 to step 421, whereat the software implemented timer TM is cleared to [0] and the loop of steps 422 to 427 is repeated.

More specifically, it is determined in decision step 422 whether or not the dial key 131 is depressed. If the dial key 131 is not depressed as represented by a NO at step 422, then processing proceeds from step 422 to the next decision step 423, whereat it is determined whether or not the talk key 132 is depressed. If the talk key 132 is not depressed as represented by a NO at step 423, then processing proceeds from step 423 to the next decision step 425.

It is determined in decision step 425 whether or not a command signal CMND whose control code CTRL indicates a request for an incoming call is transmitted from the base unit 2 via the down communication channel. If the command signal CMND is not transmitted from the base unit 2 as represented by a NO at step 425, then processing proceeds from step 425 to the next decision step 426. In step 426, it is determined whether or not the predetermined time limit of the timer TM, for example, 20 seconds has passed. If 20 seconds have not passed as represented by a NO at step 426, then processing proceeds from step 426 to step 427, whereat the timer TM is incremented by a predetermined time, and processing returns to step 422.

Accordingly, if the user picks up the handset unit 1 from the stand 50, the loop of steps 422 to 427 is repeated until the time limit of the timer TM, in that case, 20 seconds, has passed. Then, the dial key 131, the talk key 132 and the incoming call are monitored.

If the user presses the numeral key of the dial key 132 to input the first digit of the phone number to be called while the loop of steps 422 to 427 is repeated this is detected in step 422, and processing proceeds from step 422 to step 431. In step 431, data of the first digit of the phone number is stored in a buffer memory BF (not shown) of the microcomputer 140. Further, if the user depresses the numeral key of the dial key 131 to input the second digit and the following digits of the phone number to be called, then data of the numerals of the phone number to be called are sequentially stored in the buffer memory BF of the microcomputer 140 in step 432.

If the user inputs all data of the phone number to be called (e.g., if the input of the dial key 131 is interrupted for three seconds), then processing proceeds from step 432 to step 433.

In step 433, a command signal CMND whose control code CTRL indicates a request for an off-hook state is generated and this command signal CMND is transmitted to the base unit 2 via the up communication channel opened in step 420.

Accordingly, in the base unit 2, the command signal CMND is provided from the receiving circuit 220 so that the microcomputer 240 places the switch circuit 262 in the off-hook state in accordance with this command signal CMND, so that the transmitting circuit 210 and the receiving circuit 220 are connected to the telephone line network 3 through the converting circuit 261 and the switch circuit 262.

Thus, in that case, in step 420, the handset unit 1 and the base unit 2 are connected together via the communication channel and the base unit 2 is connected to the telephone line network 3, whereby the handset unit 1 is connected to the telephone line network 3 via the base unit 2.

When the handset unit 1 is connected to the telephone line network 3 via the base unit 2, then processing proceeds from step 433 to step 434, whereat data of the telephone number of the other party stored in the buffer memory BF are sequentially read out, and a command signal CMND whose control code CTRL indicates the transmission of that phone number and the phone number itself is generated. This command signal CMND is transmitted to the base unit 2.

Therefore, in the base unit 2, such command signal CMND is generated by the receiving circuit 220. Incidentally, the control code CTRL of this command signal CMND indicates the transmission of the phone number and the corresponding phone number with the result that the microcomputer 240 controls the generating circuit 263 to generate the dial tone signal corresponding to the phone number transmitted in accordance with the phone number from the handset unit 1. This dial tone signal is transmitted through the converting circuit 261 and the switch 262 to the telephone line network 3.

Thus, when the user wants to make an outgoing call, the user can make the outgoing call by picking up the handset unit 1 from the stand 50 and by inputting the phone number to be called by the dial key 131 similarly to the standard telephone set.

Processing in the communication mode is exactly the same as in the first embodiment in the routine 300. Therefore, steps represented by reference numerals in the 300s are replaced with corresponding reference numerals in the 400s and need not be further described herein.

The telephone conversation finalizing process in the quick talk mode is the same as the telephone conversation finalizing process in the quick talk mode of the first embodiment. Therefore, the respective steps represented by reference numerals in the 300s in FIG. 2 are simply replaced with corresponding reference numerals in the 400s in FIG. 4 and need not be further described herein.

An incoming call in the quick talk mode will be received by carrying out the same processing as that described for an reception of the incoming call in the quick talk mode of the first embodiment. Therefore, the respective steps carried out by the first embodiment and represented by reference numerals in the 300s are replaced with reference numerals in the 400s for the present embodiment and need not be further described herein.

Let us explain an operation that is carried out when the talk key 132 is depressed during the loop of steps 422 to 427:

If the talk key 132 is depressed during the loop of steps 422 to 427, this depression of the talk key 132 is detected at decision step 423, and then processing proceeds from step 423 to step 441. In step 441, the same off-hook processing as in step 433 is executed and then the base unit 2 is connected through the switch circuit 262 to the telephone line network 3. Then, processing proceeds to step 442.

If the user inputs the phone number to be called by the dial key 131, data of the phone number to be called are sequentially stored in the buffer memory BF. If all data of the phone number are input, then the processing proceeds from step 442 to 434. Accordingly, from now on, the dial tone signal corresponding to the phone number to be called is transmitted to the telephone line network 3 in step 434. If the called phone is answered, the telephone communication can be carried out as described above.

Let us explain the operation in which an incoming call is received during the loop of steps 422 to 427.

If the incoming call arrives through the telephone line network 3 during the loop of steps 422 to 427, the ring tone signal of this incoming call is detected by the detecting circuit 264 in the base unit 2, and a command signal CMND whose control code CTRL indicates the request of this incoming call is generated on the basis of the detected signal. Then, this command signal CMND is transmitted to the handset unit 1 via the communication channel opened at step 420.

Then, in the handset unit 1, this command signal CMND is detected at step 425, and processing proceeds from step 425 to step 412. In step 412, a ringing sound to announce the incoming call is emitted by the speaker 139 similarly to step 404, and then steps 413 and 414 are repeated.

From now on, the same auxiliary incoming call processing as described above will be executed, in which respective steps represented by reference numerals in the 300s are replaced with reference numerals in the 400s and therefore need not be further described herein.

An operation for cancelling the quick talk mode will be described, in which case the handset unit 1 is placed in the standby mode while the handset unit 1 is not placed in the stand 50.

If the user does not make an outgoing call or receive an incoming call after having picked up the handset unit 1 from the stand 50, the loop of steps 420 to 427 is repeated. If 20 seconds pass after the handset unit 1 is picked up from the stand 50, this passage of the time limit is detected at step 426, and processing proceeds from step 426 to step 428.

In step 428, similarly to step 461, a command signal CMND whose control code CTRL indicates the telephone conversation finalizing processing is generated and this command signal CMND is transmitted to the base unit 2 through the communication channel opened in step 420, so that the telephone conversation finalizing process to inhibit the transmitting circuit 120 form transmitting the signal and so on, is executed.

Also in the base unit 2, the telephone conversation finalizing command signal CMND is transmitted thereto from the handset unit 1. Therefore, the telephone conversation finalizing processing is executed so that the transmission operation of the transmitting circuit 210 is inhibited and the switch circuit 262 is placed in the on-hook condition or the like. Thereafter, the base unit 2 is placed in the standby mode.

Then, in the handset unit 1, processing proceeds from step 428 to the next decision step 471, and thereafter, steps 471, 472, 483 and 484 are repeated, thus maintaining the handset unit 1 in the standby state of the non-quick talk mode.

More specifically, similarly to step 301, it is determined in step 471 whether or not the handset unit 1 is placed in the stand 50. If the handset unit 1 is not placed in the stand 50 as represented by a NO at step 471, then processing proceeds from step 471 to the next decision step 472. In step 472, it is determined whether or not the talk key 132 is depressed. If the talk key 132 is not depressed as represented by a NO at step 472, then processing proceeds from step 472 to the next decision step 483. Similarly to steps 302 and 303, it is determined in step 483 and the next step 484 whether or not an incoming call request is made by the base unit 2. If not, then processing returns from step 483 or 484 to step 471.

Accordingly, if the handset unit 1 is not placed in the stand 50 such as when the handset unit 1 is picked up from the stand 50, when the handset unit 1 has fallen from the stand 50 or the like and the time limit of the timer TM, for example, 20 seconds, has passed from that event, then the loop of steps 471 to 484 is repeated.

In the state wherein steps 471 to 484 are repeated, as will be clear from the following explanation, the quick talk function is cancelled and the cordless telephone system is placed in the ordinary standby mode. That is, the cordless telephone system is set in the ordinary standby mode after 20 seconds, for example, has passed since the handset unit 1 was removed from the stand 50.

If the talk key 132 is depressed during the loop of steps 471 to 484, then this depression of the talk key 132 is detected in step 472 and processing proceeds from step 472 to step 473. Similarly to step 420, in step 473, a command signal CMND whose control code CTRL indicates a request for opening a communication channel between the handset unit 1 and the base unit 2 is transmitted from the handset unit 1 to the base unit 2, and therefore the communication channel is opened. Then, processing proceeds to step 441.

Accordingly, from now on, in step 441, the switch circuit 262 is placed in the off-hook state and the handset unit 1 is connected to the telephone line network 3 via the base unit 2, whereby the data of the phone number to be called can be transmitted at step 442 and the telephone conversation can be carried out at step 434.

If an incoming call arrives through the telephone line network 3 during the loop of steps 471 to 484, this is detected at steps 483 and 484, and processing proceeds from step 484 to step 485. Similarly to step 304, in step 485, the communication channel is opened between the handset unit 1 and the base unit 2. Thereafter, processing proceeds to step 412.

Accordingly, as described above, a ringing sound is produced at step 412, and then if the talk key 132 is depressed, the base unit 2 is connected to the telephone line network 3 through steps 408 and 409. Thus, the user can talk with the other party by the cordless telephone system.

The ordinary telephone conversation finalizing process is the same as that described in the first embodiment. Therefore, corresponding steps represented by reference numerals in the 300s in the first embodiment are replaced with respective reference numerals in the 400s in FIG. 4 and need not be described further herein.

The process of changing to the quick talk mode is also the same as that described in the first embodiment. Therefore, corresponding steps represented by reference numerals in the 300s in the first embodiment are replaced with respective reference numerals in the 400s in FIG. 4 need not be described further herein.

As described above, in accordance with the second embodiment, a quick talk function can be realized in the cordless telephone system. Particularly, in this embodiment, when the handset unit 1 is picked up from the stand 50, if the user wants to receive an incoming call, then the communication channel is opened between the handset unit 1 and the base unit 2 and the base unit 2 is unconditionally connected to the telephone line network 3, while if the user wants to make an outgoing call, the communication channel is opened between the handset unit 1 and the base unit 2 first. Thereafter, only when the phone number to be called is input by the dial key 131 and other operation is executed, the base unit 2 is connected to the telephone line network 3.

As set forth above, the communication channel is already opened between the handset unit 1 and the base unit 2 when the user picks up the handset unit 1 from the stand 50 and inputs the phone number to be called by the dial key 131 or the like. Accordingly, if dialing data is input, such data is immediately transmitted to the telephone line network 3 without delay. Therefore, the cordless telephone system of this embodiment can be used conveniently and usefully.

A third embodiment of the cordless telephone system according to the present invention will be explained hereinafter.

While it is determined by detecting the charge condition of the rechargeable battery 151 whether or not the handset unit 1 is picked up from the stand 50 as described above, a mechanical switch or photosensor can be used to determine whether or not the handset unit 1 is picked up from the stand 50.

If the cordless telephone is a low power type cordless telephone having a control channel available on the Japanese market, when the communication channel is opened between the handset unit 1 and the base unit 2 in step 311 and so on, the access of the signals Su and Sd up to the opening of the communication channel may be performed through the control channel. If the cordless telephone is a feeble power type cordless telephone available on the Japanese market or U.S. type cordless telephone having no control channels, the handset unit 1 and the base unit 2 may repeatedly scan and receive a predetermined channel to thereby await the connector request from the base unit 2 or from the handset unit 1.

According to the present invention, when the user picks up the handset unit 1 from the stand 50 for reasons other than making a telephone conversation or when the handset unit 1 has fallen from the stand 50 or when the handset unit 1 is not placed in the stand 50, a communication channel is prevented from being opened between the handset unit 1 and the base unit 2 meaningless and the base unit 2 is prevented from being connected to the telephone line network 3.

Furthermore, since the cordless telephone system of the present invention is changed into the ordinary standby mode after the handset unit 1 is off the stand 50 for a predetermined period of time, for example, 20 seconds, the battery 151 of the handset unit 1 is not consumed uselessly.

In addition, the user can make an outgoing call or receive an incoming call by means of the talk key 132 similarly to the standard cordless telephone.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. In a cordless telephone system comprising a base unit including means for establishing an off-hook state for coupling to a telephone ine network, and a handset unit including means for coupling to said base unit through a communications channel for carrying out a telephone conversation, said handset unit having a dial key means for entering telephone number data and said handset unit being placeable in a predetermined standby position when not in use, the improvement comprising:
   detecting means provided in said handset unit for detecting removal of said handset unit from said predetermined standby position to produce a detection signal;
   means for maintaining an on-hook state of said base unit upon production of said detection signal and until an off-hook command signal is present, and for establishing said off-hook state upon receipt of said off-hook command signal; and
   means for producing said off-hook command signal in response to operation of said dial key means.

2. In a cordless telephone system, comprising a base unit including means for coupling to a telephone line network, and a handset unit including means for coupling to said base unit through a communication channel for carrying out a telephone conversation, said handset unit having a dial key means for entering telephone number data and said handset unit being placeable in a predetermined standby position when not in use, the improvement comprising:
   detecting means provided in said handset units for detecting removal of said handset unit from said predetermined standby position to produce a detection output signal; and
   control means for maintaining an on-hook state of said base unit with respect to said telephone line network when said detection output from said detecting means indicates that said handset unit is removed from said predetermined standby position and until an off-hook enable signal is present, said control means being operative to open said communication channel between said handset unit and said base unit in the presence of said detection output signal when said dial key means is operated to enter telephone number data.

3. In a cordless telephone system comprising a base unit including means for coupling to a telephone line network, and a handset unit including means for coupling to said base unit through a communication channel for carrying out a telephone conversation, said handset unit having a dial key means for entering telephone number data for transmission to said base unit and said handset unit being placeable in a predetermined standby position when not in use, the improvement comprising:
   detecting means provided in said handset unit for detecting removal of said handset unit from said predetermined standby position;
   means for opening a communication channel between said handset unit and said base unit in response to the detection of the removal of said handset unit from said predetermined standby position by said detecting means; and
   means for coupling said base unit to said telephone line network in response to operation of said dial key means such that telephone number data entered by said dial key means is transmitted to said telephone line network from said handset unit through said communication channel and said base unit to thereby make an outgoing call.

4. The cordless telephone system of claim 1, wherein said handset unit includes talk key means for entering a talk command signal, and wherein the means for producing said off-hook command signal is operative in a first operational mode for a predetermined time period after production of said detection signal to produce said off-hook command signal in response to operation of said dial key means, and after expiration of said predetermined time period, is operative in a second operational mode to produce said off-hook command signal in response to the entry of said talk command signal by said talk key means.

5. The cordless telephone system of claim 1, wherein said means for producing said off-hook command signal is operative to produce said off-hook command signal in response to said detection signal upon receipt of an incoming call by said cordless telephone system.

6. The cordless telephone system of claim 1, further comprising means for establishing an on-hook state of said base unit upon return of said handset unit to said predetermined standby position after establishment of an off-hook state of said base unit.

7. The cordless telephone system of claim 4, wherein said means for producing said off-hook command signal is operative for a predetermined time after the termination of a telephone conversation to produce said off-hook command signal in response to operation of said dial key means.

8. The cordless telephone system of claim 4, wherein said means for producing said off-hook command signal is operative to establish a standby mode of operation upon return of said handset unit to said predetermined standby position such that, in said standby mode of operation, said means for producing said off-hook command signal is operative to establish said first operational mode upon production of said detection signal by said detecting means.

9. The cordless telephone system of claim 1, wherein said handset unit comprises rechargeable power source means for providing operational power to said handset unit, wherein said cordless telephone system further comprises means for providing a charging current to said rechargeable power source means when said handset unit is in said predetermined standby position, and wherein said detecting means comprises means for detecting an interruption of said charging current upon removal of said handset unit from said predetermined standby position.

10. The cordless telephone system of claim 2, further comprising means for producing said off-hook enable signal upon operation of said dial key, and wherein said control means is operative to establish an off-hook state of said base unit upon production of said off-hook enable signal in the presence of said detection output signal.

* * * * *